July 6, 1926.

S. E. BAILOR

PLANTER

Filed March 16, 1925  2 Sheets-Sheet 1

1,591,266

INVENTOR
S. E. Bailor.
BY
ATTORNEY

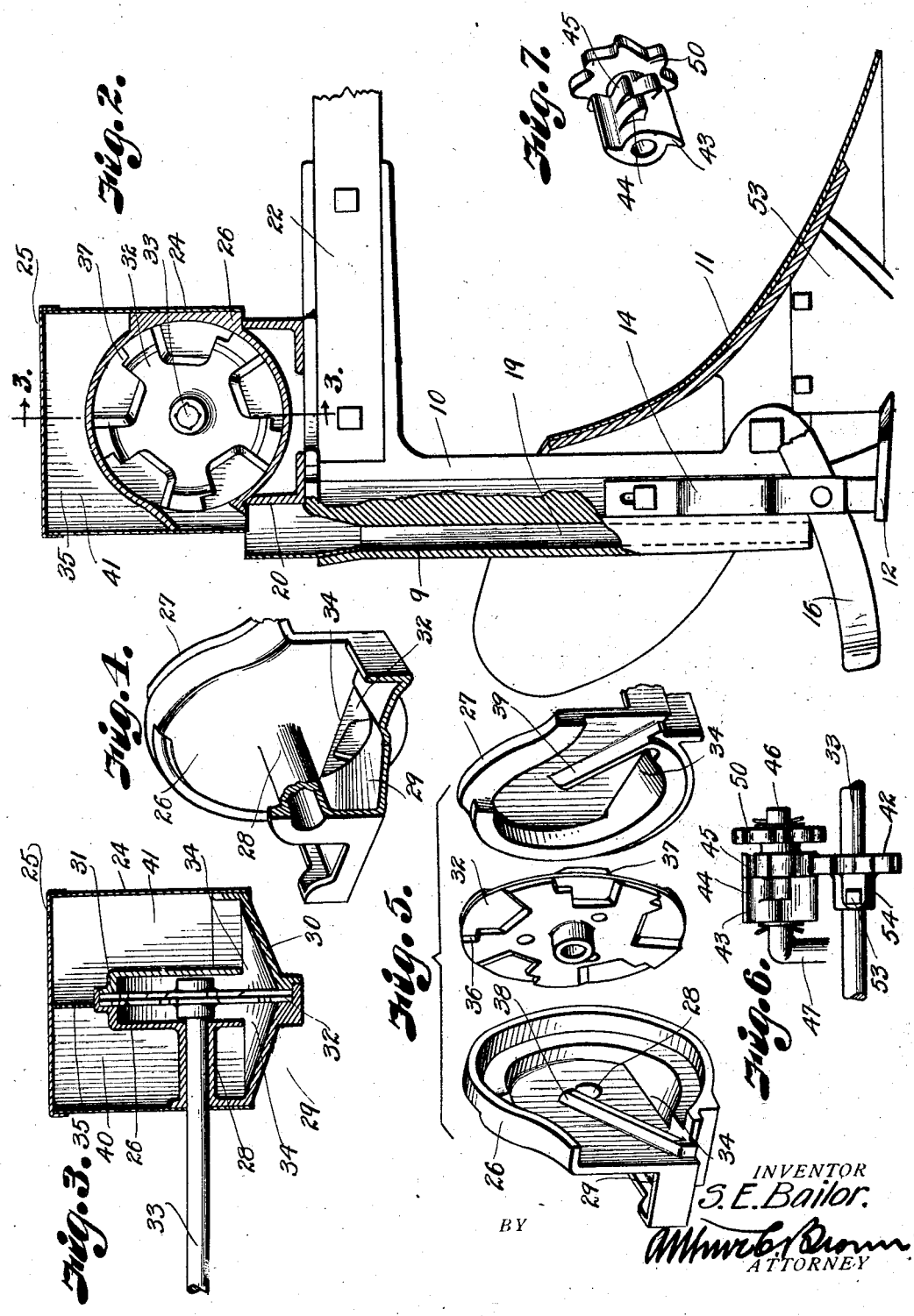

Patented July 6, 1926.

1,591,266

UNITED STATES PATENT OFFICE.

SILAS E. BAILOR, OF ATCHISON, KANSAS.

PLANTER.

Application filed March 16, 1925. Serial No. 15,829.

This invention relates to planters and particularly to a riding planter adapted to plant either of two kinds of seed, or both, at the same time. For example, sometimes it is advantageous to plant corn alone. At other times beans, and at still other times corn and beans may both be planted simultaneously, therefore I have provided means whereby the simultaneous planting of corn and beans can be accomplished in an expeditious and convenient manner and to this end the invention consists of certain novel parts and combinations of parts all of which will be specifically described hereinafter, reference being had to the accompanying drawings, in which—

Fig. 1 is a perspective view of a planter constructed in accordance with my invention.
Fig. 2 is a vertical, sectional view showing the dropper, the boot and the shoe for opening the furrow, together with the coverer, the latter being shown in elevation.
Fig. 3 is a cross sectional view through the hopper or seed box and through the dropper housing, the section being taken on a line 3—3 of Fig. 2.

Fig. 6 is a detailed view of the gearing for driving the hopper disks.

Fig. 7 is a detailed, perspective view of the driving gear for the disk shaft supporting gear.

Figure 1:
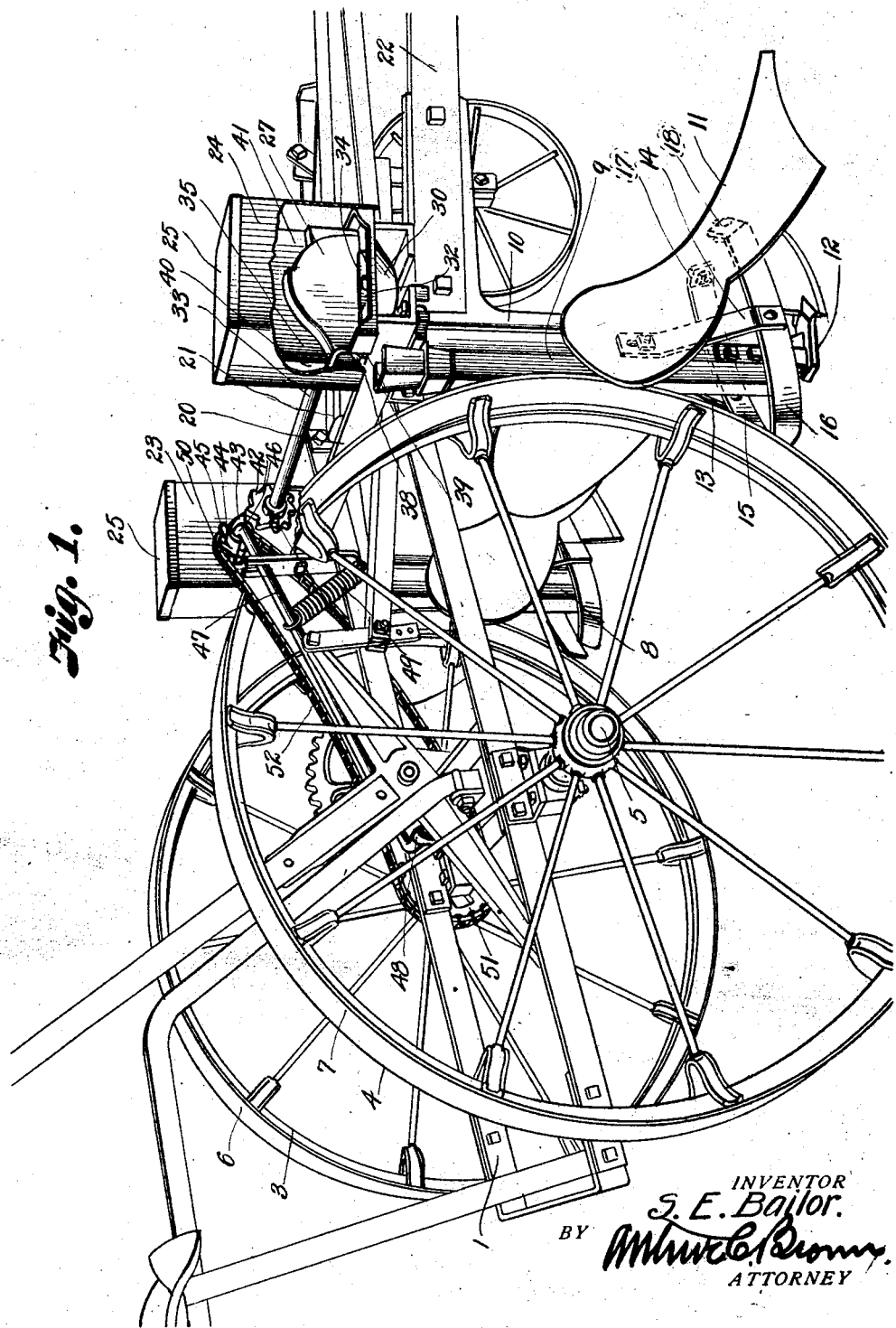
Figure 1:
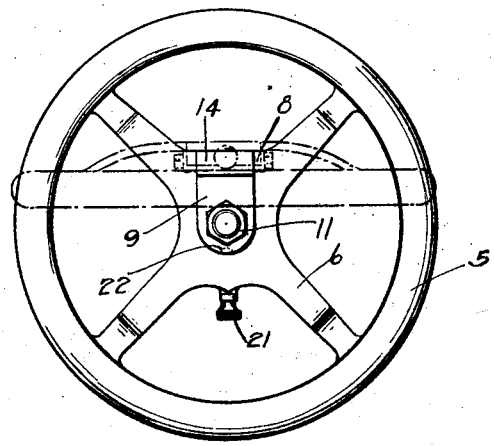
Figure 2:
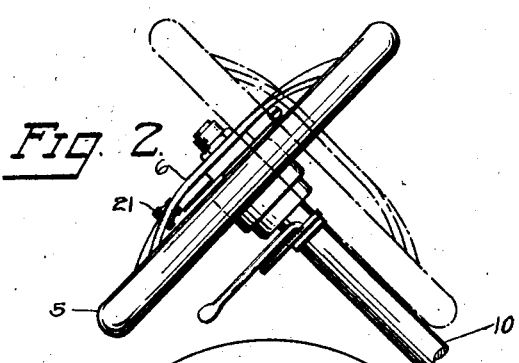
Figure 4:
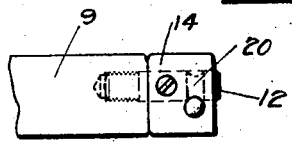
Fig. 4 is a fragmentary, perspective view of one side of the dropper housing.
Figure 5:
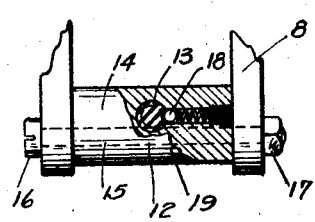
Fig. 5 is a disassociated view of the two halves of the dropper housing and the dropper disk.
Figure 3:
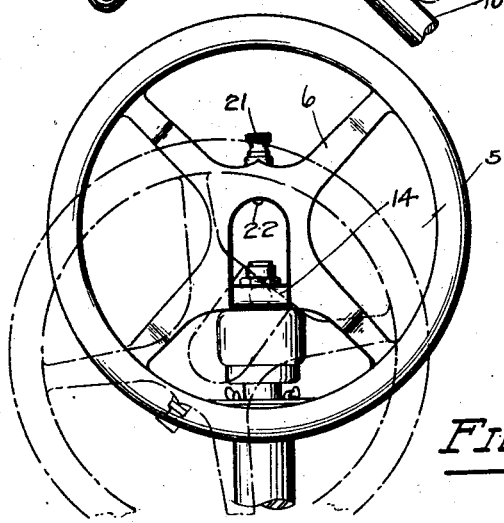

Carried by the standard are two vertical adjustable outwardly positioned depending bracket arms 13 and 14 which support the middle portions of the covering wings 15 and 16, the forward ends of which are fastened to the shovel at 17 and 18. These wings are spaced apart at their rear ends and they are slightly bowed so that they will hold the furrow open adjacent to the end of the vertical chute 19 but will tend to cause the earth, at the edge of the furrow, to fill in over the grain or seed and as these are in line with the wheels it is obvious that the wheels will slightly pack the earth on top of the seed but with not sufficient density to close the capillaries. The novel means for feeding the seed is best shown in Figs. 4 to 5, both inclusive, and as each seed box or hopper, like each boot or standard, is a duplicate of the other I shall describe only one.

The two standards are connected by one or more cross braces 20 and on each of the beams 21 and 22, that is one for each standard, is a hopper, the hoppers being designated 23 and 24. Each hopper has a removable cover 25 so that seed may be introduced into it. Within each hopper is a dropper housing shown as comprising two mating halves or castings 26 and 27, each substantially a duplicate of the other except that the inner half in each instance is provided with a shaft bearing 28. The two halves support bottom members 29 and 30 for the hopper and when the two halves are brought together they form an annular groove or recess 31 within which rotates the dropper disk 32 fastened on a shaft 33, it being understood that the shaft extends July 6, 1926.

S. BAKEWELL

STEERING WHEEL

Filed April 21, 1923

1,591,267

INVENTOR.
Sidney Bakewell.
BY
Rex Frye.
ATTORNEY.